United States Patent

[11] 3,627,972

[72] Inventors William F. Iceland
Los Alamitos;
Donald E. Reinhart, Los Angeles, both of Calif.
[21] Appl. No. 7,392
[22] Filed Jan. 30, 1970
[45] Patented Dec. 14, 1971
[73] Assignee North American Rockwell Corporation
Continuation of application Ser. No. 759,459, Sept. 12, 1968, now abandoned. This application Jan. 30, 1970, Ser. No. 7,392

[54] WELD CONTROL
4 Claims, 4 Drawing Figs.
[52] U.S. Cl. .................................................. 219/124,
219/60 R
[51] Int. Cl. ..................................................... B23k 9/12
[50] Field of Search ........................................ 219/124–126,
60.1, 131; 314/63

[56] References Cited
UNITED STATES PATENTS
| | | | |
|---|---|---|---|
| 2,089,014 | 8/1937 | Bucknam et al. ............. | 219/135 X |
| 3,240,913 | 3/1966 | Schubert ...................... | 219/60 |
| 3,299,250 | 1/1967 | Vilkas et al. .................. | 219/124 X |
| 3,335,254 | 8/1967 | Vilkas et al. .................. | 219/60.1 |

FOREIGN PATENTS
| | | | |
|---|---|---|---|
| 200,060 | 7/1967 | U.S.S.R. ........................ | 219/8.5 |

Primary Examiner—J. V. Truhe
Assistant Examiner—L. A. Schutzman
Attorneys—William R. Lane, Allan Rothenberg and Sidney Magnes ABSTRACT: This disclosure relates to welding, and provides improved welding control by monitoring the heat radiations emitted at the weld area; the amount of these radiations indicating the condition of the weld puddle and its penetration through the workpiece. A new approach integrates the heat flux from a relatively large viewing area, and provides welding control that is far superior to that obtained by prior art systems.

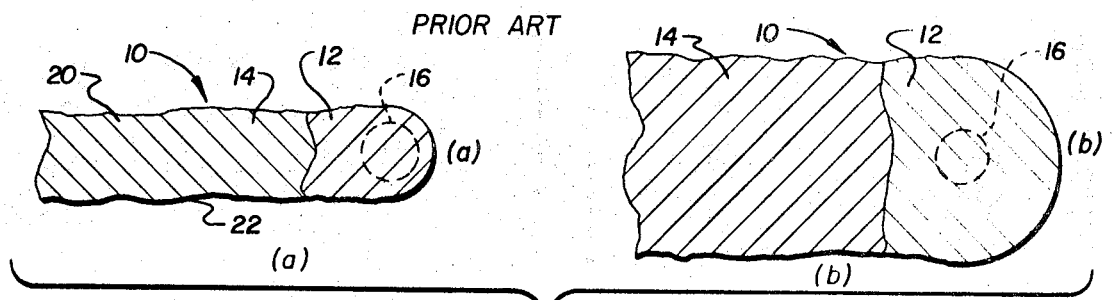
FIG. 1
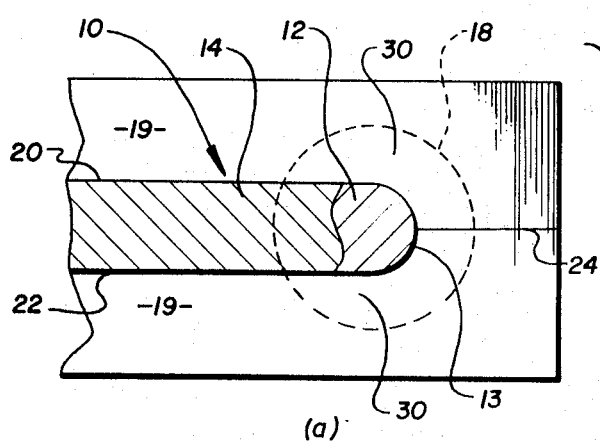
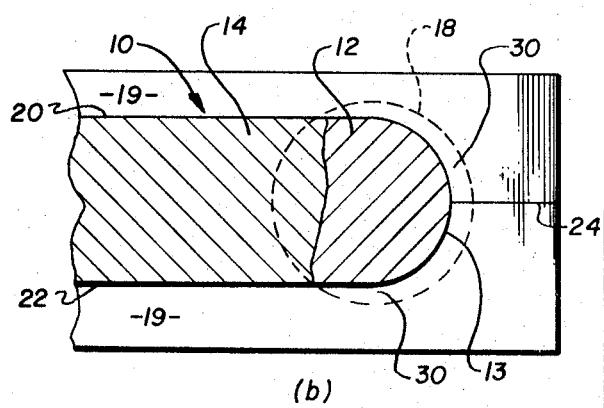
FIG. 2
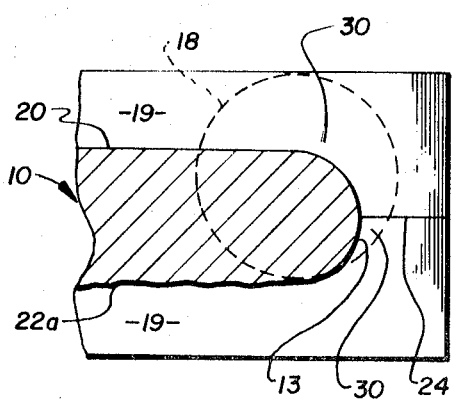
FIG. 3
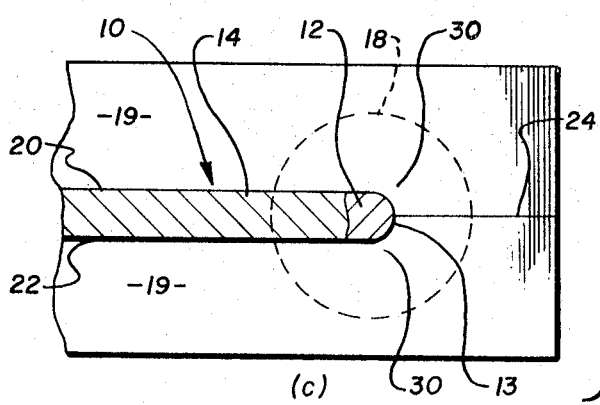

WELD CONTROL

This application is a continuation of our patent application Ser. No. 759,459, filed on Sept. 12, 1968, now abandoned.

BACKGROUND

In the welding process of joining adjacent pieces of material, a small amount of a material is heated to its melting point; and when this molten material cools, it unites with the pieces of material to be welded together. Depending upon conditions, the molten may be part of the workpiece; or may—alternatively—be material from a welding rod or weld wire that is being fed into the welding area.

In either case, the molten material forms a "weld puddle" that eventuates into a "weld bead." As such, the weld puddle is quite important to the welding operation. It should not be too big, or too small; it should penetrate a predetermined distance into or through the workpiece; it should have an optimum temperature and shape; it should not contain occluded entrapped gases; etc. These weld puddle characteristics are determined in part by the size, thickness, shape, and characteristics of the workpiece; by the amount of heat that is being applied to the workpiece by means of the electric arc or the welding torch; by the impurities in the workpiece, in the weld rod, or in the inerting gas; by the rate of movement of the welding apparatus and/or the workpiece; and by a number of other conditions.

In the past, a skilled welder watched the weld puddle; and, from experience, judged whether the welding operation was proceeding satisfactory—if not, he made predetermined adjustments.

In present-day welding, the quality requirements of the finished weld are often so exacting as to be beyond the ability of the hand welder. Automatic welding machines are therefore being used; and, in general, these produce satisfactory results. However, in order to do so, the automatic welding machine must monitor so many different parameters that it becomes extremely complex; and its reliability therefore tends to suffer.

It has been found that one of the most desirable ways to produce a high-quality weld is to monitor the weld puddle. If this puddle exceeds predetermined characteristics, automatic equipment can sense these deviations; and can then instantaneously apply the proper compensating factors to the welding apparatus.

A number of such weld puddle monitoring devices have been introduced in the past. The more successful ones comprised an infrared (IR) sensor that measured the infrared, or heat, radiations from the weld puddle. For convenience, the infrared sensor was generally placed at the back portion of the workpiece, i.e., on the other side from the heat source; so that as the weld puddle penetrated the thickness of the workpiece, its radiations could readily be picked up by the infrared sensor. This technique thus controlled the weld puddle "penetration."

While prior art infrared devices worked quite satisfactorily, they never quite achieved the success promised by their theory.

OBJECTS AND DRAWINGS

It is therefore an object of the present application to provide an improved weld control system.

The attainment of this object—and others—will be realized from the following detailed description, taken in conjunction with the drawings, of which FIGS. 1, 2, and 3 illustrate the viewing area "seen" by the infrared sensor; and FIG. 4 shows a combination block and schematic diagram of the overall circuit.

INTRODUCTION

As pointed out above, prior art infrared weld control circuits used an infrared sensor that monitored the weld puddle. As the weld puddle approached and/or achieved penetration of the workpiece, the infrared sensor produced a signal that was used to reduce the amount of heat applied to the welding area. This weld puddle monitoring system, while superior to many previous weld control systems, did not provide the desired idealized operation; and may have been based on an incomplete analysis of the welding operation. For example it was assumed that the weld puddle increased its temperature under certain conditions, as when the workpiece became thinner, stopped moving, etc.; and that the increased temperature produced the infrared sensor signal.

The present application is based upon the belief that the above assumption is not completely correct; and the reasoning will be realized from the following discussion. The weld puddle comprises, basically, the same material as the workpiece. Since the weld puddle is in a liquid form, it is ordinarily at, or near, the melting temperature of that material. Applying more—or less—heat to the welding area does not instantly, or sometimes appreciably, change the temperature of the weld puddle; so that the infrared sensor signal did not necessarily conform to the instantaneous welding conditions. The differences between these two basis will be discussed later.

Another of the prior art problems will be realized from the following discussion. In order for the infrared sensor to detect a change in temperature of the weld puddle, and to produce a maximal output signal as the temperature of the weld puddle increased, the infrared sensor was at the receiving end of an optical system that "looked" at only the weld puddle proper; i.e., a portion of the weld puddle itself was imaged on the infrared sensor. Thus, if the weld puddle became hotter, its image on the infrared sensor produced a larger output signal from the sensor. As indicated above, the sensor signal often lagged changes in the welding operation; so that the apparatus did not always work in accordance with its theory.

Applicants theorized that thermal inertia, boiling, etc. tended to cause the weld puddle to remain at substantially the same temperature when different amounts of heat were applied to the weld area; but that the size of the weld puddle increased or decreased—depending upon the amount of heat applied. In order to take advantage of this, applicants revised the optical system and the infrared sensor. First of all, they adjusted the apparatus (by means of optical filters, electronic circuitry, etc.) in order to assure that only radiations corresponding to the desired temperature range were transmitted to the infrared sensor. Secondly, applicants revised the optical system so that it had a larger viewing area, this being achieved most conveniently by increasing the angle of view from about 1 degree to about 3 degrees. As a result, the sensor "saw," not a small portion of the weld puddle itself, but rather saw a larger area that included the weld puddle and a surrounding portion of the workpiece. This concept, and apparatus for achieving this result will be understood from the following discussion.

DETAILED DESCRIPTION

Figure 4:
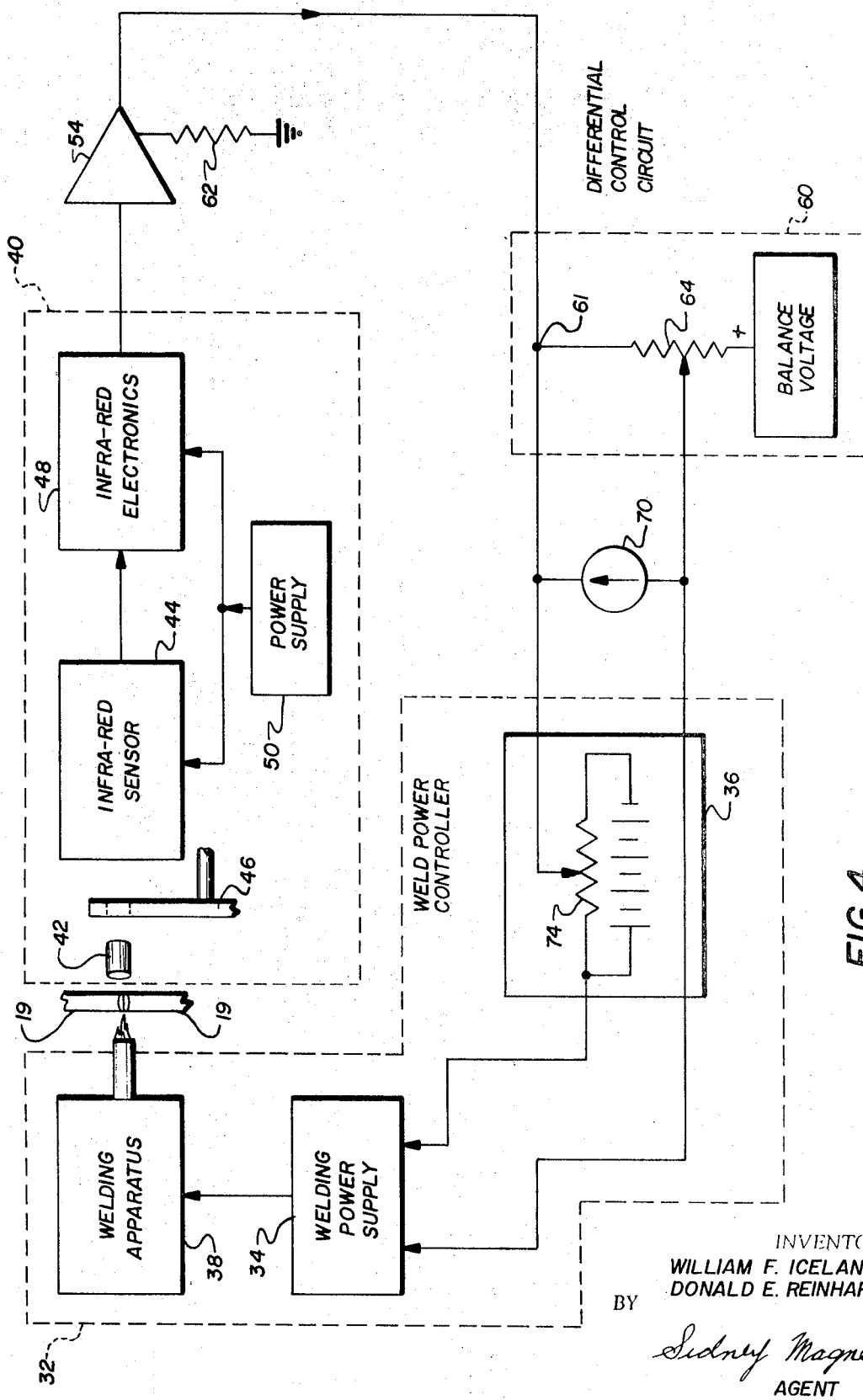

Attention is directed to FIG. 1a; this showing the leading portion 10 of a weld bead, comprising a molten weld puddle 12, a cooler "plastic" portion 14 directly behind the weld puddle, and longitudinal edges 20 and 22—the weld puddle illustrated as moving to the right relative to the workpiece. The prior art used a viewing area indicated by circle 16; this viewing area covering only a portion of weld puddle 12.

As the weld puddle moved rightward (or as the workpiece moved past the welding apparatus), assume that for some reason (such as a thinning of the workpiece) that an inordinately large amount of energy is concentrated in the new welding area. As a result, (see FIG. 1b) the weld bead 10 has grown extremely large, but not proportionately hotter. However, the viewing area 16 fails to note any difference in size; and the lagging increased sensor signal belatedly indicates that the welding operation is temporarily out of control.

Referring now to FIG. 2a, this also indicates the rightward-moving weld bead 10 and a new viewing area 18 that is large enough to include the weld puddle 12, its leading edge 13, the plastic portion 14 of the weld bead, an appreciable area of the workpiece 19, and its abutting edges 24. It will be realized from FIG. 2a that the entire viewing area 18 produces an "integrated" amount of heat "flux" radiating from the highly heated weld puddle 12, from the somewhat cooler plastic portion 14, and from the relatively cool workpiece 19. As will be shown later, it is this total integrated heat flux that is used to produce the weld control signal.

FIG. 2b shows the situation when, for some reason, an excessive amount of energy has been concentrated in the weld area. It will be seen that weld bead 10 has enlarged appreciably; but that the viewing area 18 still encompasses a portion of the workpiece 19, the weld puddle 12, the leading edge 13, and the plastic portion 14 behind the weld puddle.

It will be noted that the weld bead 10 may now cover as much as half of the viewing area 18; and that due to its temperature, compared to that of the workpiece, it will be producing a disproportionate amount of the integrated heat flux. In the case of FIG. 2b, the weld bead could be producing as much as 90 percent of the total heat flux; whereas in the normal condition illustrated in the FIG. 2a, the weld bead might be only producing about 50 percent of the total heat flux. Thus, when the welding operation approaches an unsatisfactory overheated state, the viewing area of FIG. 2b produces a sensor signal that may be instantaneously double its previous value; and this signal is used for controlling the welding operation.

While the above explanation has been presented in terms of an increased-size weld puddle, a similar situation exists for a decrease in the size of the weld-size of the weld puddle; this being shown in FIG. 2c. Here the weld puddle size has decreased; so that it may produce as low as 5 percent of the integrated heat flux. This results in an instantaneously decreased sensor signal, which is used for controlling the welding operation.

It should be noted that the longitudinal edges 20, 22 of weld bead 10 are straight in FIGS. 2a, 2b, and 2c; and are jagged in FIG. 1a and 1b—thus indicating the improved welding control. The substantial centering of the weld bead's head portion (the portion comprising its leading edge and its two longitudinal edges) produces weld control signals that straighten out both of the weld bead's longitudinal edges 20 and 22.

Attention is now directed to FIG. 3, which shows the situation wherein the viewing area 18 does not encompass the entire head portion of weld bead 10. Under this condition—for reasons not completely understood—only a partially effective weld control signal is produced. Here the viewing area does not encompass the lower longitudinal edge 22a; but does encompass the upper portion of the head and upper longitudinal edge 20 of the weld bead. Longitudinal edge 20 is properly controlled, as previously described. However, lower edge 20a tends to remain somewhat ragged.

FIG. 4 is a combination block and schematic drawing of equipment for practicing the disclosed invention. Here a workpiece 30 (which may be planar, curved, domed, or the like) is to be welded by welding equipment identified by reference character 32; this comprising a welding power supply 34, a welding power controller 36, and the actual welding apparatus 38 that comprises in part the actual torch or electrode that is used for establishing and controlling the welding operation. Guiding and aligning techniques such as the "skate technique," may of course be used. Welding equipment 32 is readily available (for example "Weltronarc" Model 600–6313 manufactured by the Weltronic Corporation of Detroit), and is available in a wide variety of types; but each automatic type contains means for utilizing a control-signal that controls the welding operation. In the TIG (Tungsten-Electrode Inert Gas) welding technique, the control signal to welding apparatus 32 controls the electric current flowing through the welding electrode; and thus controls the welding operation. In the MIG (Metal-Electrode Inert Gas) welding technique, the control signal to welding apparatus 32 controls the feed-rate of the metal electrode; and thus controls the welding operation. In torch welding, the control signal to welding apparatus 32 may be such as to control the amount of gas being used for the welding operation. In any case, welding apparatus 32 is of the type that utilizes a control signal to control the welding operation.

System 40 comprises an optical system 42 positioned adjacent workpiece 30 in such a way that it produces a field of view that encompasses the previously discussed welding area; and this viewing area is imaged onto an infrared sensor 44—an eyepiece permitting the operator to initially adjust the equipment—by physically moving and pivoting system 40 or the optical portion thereof to obtain the desired viewing area. System 40 also contains provisions for the insertion of a standard optical filter (not shown) within system 42 that helps restrict the impinging radiations to those associated with the temperature range under consideration; and—in additional—comprises a light chopping arrangement 46 that causes the resultant electrical signal to have particular frequency that is easily recognized, amplified, detected, and rectified.

In any case, the heat flux emanations from the integrated viewing area of workpiece 30 are imaged by optical system 42 onto infrared sensor 44; the electrical signals being operated upon by a suitable package 48 of IR electrodes—system 40 being powered by a power supply 50. While a number of infrared systems are available, a system identified as the "INFRASCOPE," available from the Huggins Laboratories of Sunnyvale, California, is such that the impinging infrared radiation is "chopped" at a predetermined frequency; and impinges in the form of distinct light pulses onto infrared sensor 46. This sensor converts these light pulses to electrical pulses, amplifies them, and rectifies them to produce a DC sensor signal—this being applied to a DC amplifier 54.

In order to produce a weld control signal, the IR-signal from amplifier 54 is first compared with a balancing voltage in differential control circuit 60. This circuit, as shown in FIG. 4, applies the balancing voltage across a potentiometer 64. The operation of differential control circuit 60 is such that—at point 61—the balancing voltage normally balances, or "-nulls," the quiescent IR-signal from amplifier 54; this being achieved by suitable control the balance voltage voltage—whose voltage drop across resistance 64 is thus made equal to the IR-signal from amplifier 54.

When, however, the welding operation is such as to radiate a changed amount of integrated heat flux from the viewing area, amplifier 54 produces an IR-signal that upsets the null condition of differential control circuit 60; which produces—at point 61—a "difference" signal whose amplitude and polarity indicate the instantaneous condition of the welding operation, as revealed by the impinging infrared radiation.

If desired, the IR-signal from infrared system 40 may be AC rather than DC and/or the amplification may be performed on the difference signal from the differential control circuit 60. Moreover, the sensor signal may alternatively be digitized, binary-coded, pulse-coded, or the like; and one state of these signals may be used for "positive" (more heat) control, whereas another state of these signals may be used for "negative" (less heat) control.

The difference signal at circuit 60 is applied to two places; the first being to a signal-monitoring meter 70; and the other being to potentiometer 74 of welding power-controller 36. It should be noted that meter 70 indicates the magnitude of the difference signal that is being applied for controlling the welding operation.

Even during machine welding, there are times when it is desirable to manually control, or to "override" the welding operation; and for this purpose the welding power-controller 36 contains a potentiometer 74 that has its own reference voltage; the output of this potentiometer being applied to the welding power supply 34. The "slider" of potentiometer 74 is set so that its quiescent value provides the quiescent signal required by welder 32. Thus, the operator can—by adjusting potentiometer 74—manually control the welding operation. For automatic operation, as shown in FIG. 4, the difference signal applied to potentiometer 74 adds to or detracts from the reference voltage to provide the weld control signal. If a more responsive system is required, potentiometers 64, 74 may be set to produce a larger effect for the same magnitude IR-signal from amplifier 54; whereas if a less-responsive system is required, one or both of these potentiometers may be set in the opposite direction.

Thus, the disclosed apparatus is therefore responsive both to manual control and to the IR-signal produced by the infrared system.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. Welding apparatus comprising:
    welding means for heating an area of a workpiece to form a molten weld puddle in way of the welding means, wherein said puddle inherently radiates heat energy in direct relation to the areal size of said puddle;
    means for sensing the total heat energy flux radiated from an area of a fixed size which is substantially larger than the area of said weld puddle and producing a signal that is proportional to the total flux sensed; and
    means responsive to said signal for controlling said welding means and in turn controlling the areal size of said weld puddle.

2. The apparatus of claim 1 wherein said means for sensing comprises:
    an optical system for viewing said fixed-size area and producing said signal as an electrical signal indicative of the total heat flux radiated therefrom and in turn the areal size of the weld puddle; and
    electronic means for processing said electrical signal to an amplified signal which is coupled to said means for controlling.

3. The apparatus of claim 2 wherein said means for controlling comprises:
    a power supply for feeding welding power to said welding means; and
    means responsive to said amplified signal for changing the power supplied by said power supply in relation to said amplified signal so that the areal size of said puddle is held substantially constant.

4. A method of welding a workpiece comprising the steps of:
    heating the workpiece to form a weld puddle;
    causing the weld puddle to move along the workpiece;
    establishing a fixed size viewing area on said workpiece, the size of which is substantially larger than said weld puddle;
    causing the fixed size viewing area to progress along the workpiece with said weld puddle;
    maintaining all of the weld puddle within said viewing area;
    sensing the heat flux radiating from said viewing area and forming a signal indicative of the total heat flux radiating from said viewing area; and
    controlling the size of the weld puddle in accordance with the amplitude of said signal.

* * * * *